3,625,018
CRYOGENIC FEEDTHROUGH
Edward J. Roberts, Hampton, Va., assignor to the United States of America as represented by the Administrator of the National Aeronautics and Space Administration
Filed Oct. 20, 1969, Ser. No. 867,851
Int. Cl. F16l 5/00
U.S. Cl. 62—55.5
2 Claims

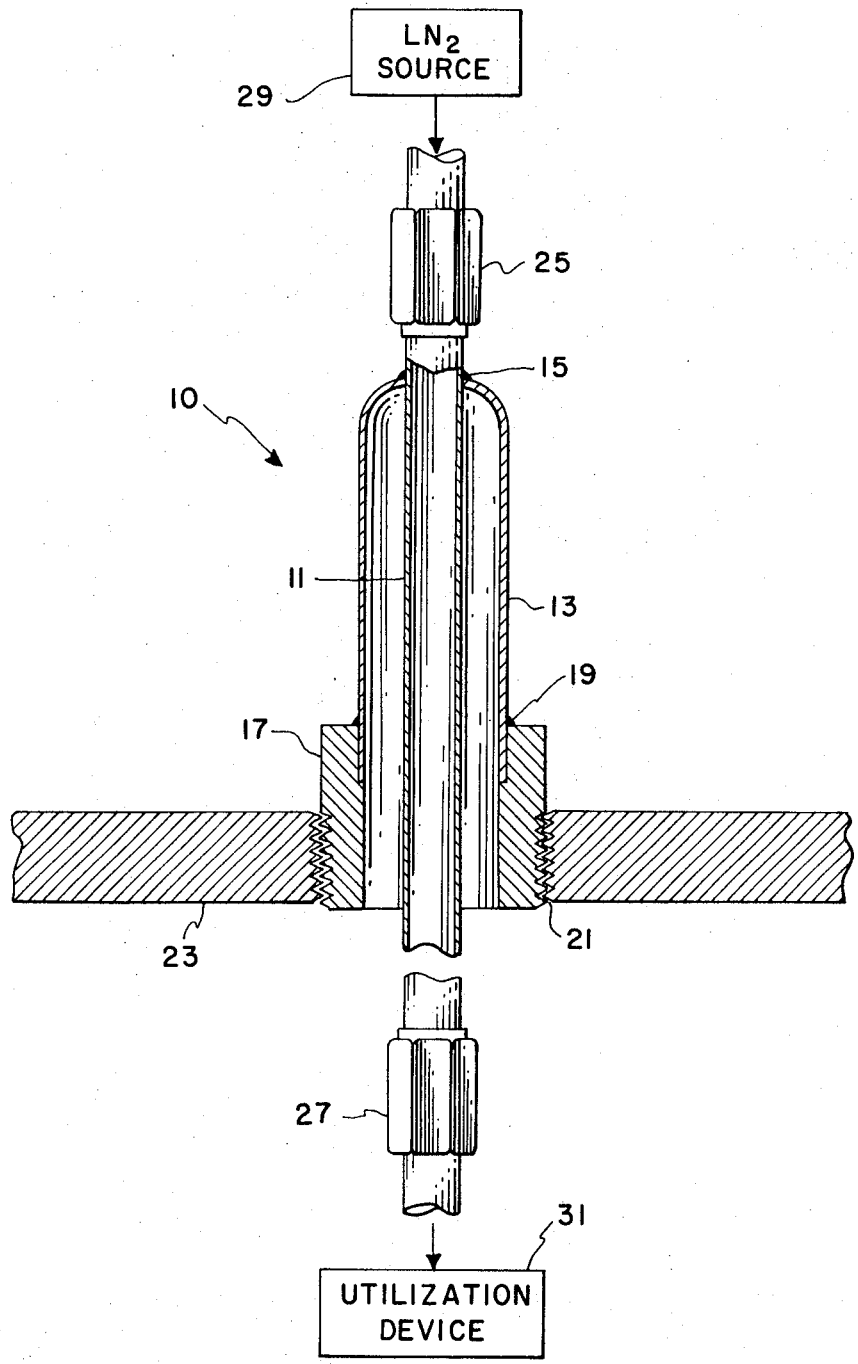

ABSTRACT OF THE DISCLOSURE

A penetration unit for transferring liquid cryogenics from a source through the chamber wall of a vacuum system to a cryopanel or the like.

ORIGIN OF THE INVENTION

This invention was made by an employee of the National Aeronautics and Space Administration and may be manufactured by or for the Government of the United States without the payment of any royalties thereon or therefor.

This invention relates generally to a penetration unit and relates in particular to a cryogenic feedthrough for transferring liquid nitrogen through the chamber wall of a vacuum system without the time-consumption and expense of modifying the chamber as required for presently available penetrators of this type.

In the use of liquid nitrogen and other cryogenics, it is frequently necessary to transfer the liquid gas through the chamber wall of a vacuum system to reach the cryopanel, or the like, and such transfer must be made in such manner that leaks do not occur in the vacuum system. It is essential to use a penetration unit when passing liquid nitrogen through a chamber wall to prevent conduction to the chamber which results in large cold spots in the chamber wall. There are presently available commercial penetrators for use with liquid nitrogen systems but all of which have numerous disadvantages. For example, the components of the commercially available penetrators such as flanges, tubing connections, tubing and O-ring seals must be purchased with the penetration unit. The chamber wall must then be modified to accept the penetration which requires cutting holes in the chamber wall and welding in pipe and flanges. These welded surfaces permit conduction from the penetrators and the cold temperatures involved cause failure in the O-rings and permit leaks. Also, when these commercially available penetration units are removed from the vacuum chamber wall, the flange must be blanked off which requires a special flange and another O-ring. This results in an increase in volume in the vacuum chamber and possible potential leaks due to welding. Since the equipment for liquid nitrogen changes due to varying environmental test procedures these prior art penetration units are not practical for use with present day test equipment. There is thus a definite need in the art for a simple, inexpensive and easy-to-use penetration unit.

Accordingly, it is an object of the present invention to provide a unitary penetration unit requiring no special flanges, spacers, blank-off parts or O-rings for use.

Another object of the present invention is a penetration unit that can be mounted quickly and easily to any part of a chamber having a pipe threaded hole.

Another object of the present invention is a penetration unit having a minimum number of component parts and welded connections.

Another object of the present invention is a penetration unit that can be replaced by a pipe plug without increasing the volume of the chamber in which it is installed.

According to the present invention, the foregoing and other objects are attained by providing a penetration unit consisting of a double-wall tube with the one end of the shorter outer tubular wall being welded to a coupling having pipe threads thereon and the other end of the outer tubular member being swaged down and welded to a smaller inner tubular member. The inner tubular member may then be fitted with flare couplings at both ends to permit connection of the penetration unit with the liquid nitrogen source and to the cryopanel. The threaded coupling, integrally attached to the outer tubular member, may then be used to mount the penetration unit to any part of a vacuum chamber wall, or the like, that is provided with a pipe threaded hole. The only tool required for mounting of the unit is an open end wrench for tightening. If no hole exists in the vacuum chamber wall, it is a simple task to drill and tap the proper size hole at the desired location, whether it is on a radius surface or flat. Due to the long conduction path from the inner tube to the point of contact with the chamber wall where the unit is attached to the wall any cold conduction to the wall which would result in cold spots and frost buildup is minimized. When the penetration unit is no longer needed, it may be removed and replaced with a conventional pipe plug without increasing the volume of the vacuum chamber.

A more complete appreciation of the invention and many of the inherent advantages thereof will be more clearly understood by reference to the following detailed description when considered with the accompanying drawing, wherein:

The single figure is a part sectional view of the penetration unit of the present invention installed in a vacuum chamber wall.

Referring to the drawing, the penetration unit of the present invention, generally designated by reference numeral 10, includes an elongated inner tubular member 11 and an outer tubular member 13. The outer tubular member 13 is of larger diameter than inner tubular member 11 with one end thereof being swaged down and welded to the exterior of tubular member 11, as designated by reference numeral 15. A threaded male coupling 17 is welded to the other end of outer tubular member 13, as designated by reference numeral 19. Coupling 17 serves to secure penetration unit 10 to the threaded opening 21 of a chamber wall 23 of a vacuum system. The nonthreaded exterior surface of coupling 17 is designed to be engaged by a suitable spanner wrench or the like to permit tightening of penetration unit 10 within opening 21 in a conventional manner. Inner tubular member 11 is provided with suitable end couplings 25 and 27 to permit connection of penetration unit 10 with the liquid nitrogen source 29 and with the particular utilization device 31 contained within vacuum system chamber wall 23. Utilization device 31 is normally a cryopanel positioned within a suitable vacuum system. When the penetration unit 10 is no longer needed and is removed from vacuum chamber wall 23, it is replaced by a conventional pipe plug. Also, if it is desired to insert a penetration within a chamber wall where no hole exists it is a small task to drill and tap the proper size hole at the desired location, whether it is on a radius surface or flat.

The preferred material for constructing penetration unit 10 is stainless steel, because of its low conductivity, with silver solder being employed to make fluid-tight weld connections 15 and 19. Also, the space between tubular members 11 and 13 is under vacuum in use and thus serves as an excellent insulator to keep any frost buildup to a minimum and thereby avoid leaks and cold spots from developing which would result due to conduction.

It is thus seen that penetration unit 10 provides numerous advantages over commercially available penetrators. Specifically, the penetration unit 10 remains as one unit, has only two welded connections and requires no special flanges, spacers, blank-off parts of O-rings. In addition, the penetration unit of the present invention can be mounted quickly and easily to any part of a chamber wall having a pipe threaded hole and the only tool required is an open end or spanner wrench for tightening.

Although the invention has been described relative to a particular embodiment thereof, there are obviously numerous variations and modifications readily apparent to those skilled in the art in the light of the above teachings. It is therefore to be understood that the invention may be practiced otherwise than as specifically described.

What is claimed as new and desired to be secured by Letters Patent of the United States is:

1. In combination, a liquid cryogenic source, and a vacuum system containing a utilization device for liquefied cryogenics, the improvement therewith comprising:
 a penetration unit for transferring liquefied gases from said source through the vacuum chamber wall to said utilization device,
 said penetration unit including an elongated inner tubular member for transferring the liquefied gases,
 said inner tubular member being fitted with couplings at each end to permit connection thereof with said liquefied gas source and said utilization device,
 an elongated outer tubular member positioned over an intermediate length of said inner tubular member,
 said outer tubular member being of a larger diameter than said inner tubular member and having
  (1) one end portion swaged down to the diameter of and integrally attached to said inner tubular member, and
  (2) an integrally attached threaded coupling provided on the other end portion,
 said threaded coupling permitting threaded connection of said penetration unit to any part of a chamber wall having a threaded opening therein.

2. The penetration unit of claim 1 wherein said outer tubular member is welded to said inner tubular member at the swaged down end portion only and said integrally attached threaded coupling is welded to said outer tubular member,
 said inner and said outer tubular members being constructed of stainless steel tubing and said weld connections being silver solder vacuum-tight connections.

References Cited

UNITED STATES PATENTS

| | | | |
|---|---|---|---|
| 2,239,895 | 4/1941 | Kuhner | 122—365 X |
| 2,331,932 | 10/1943 | Rowand | 285—187 X |
| 3,103,108 | 9/1963 | Santeler | 62—259 X |
| 3,168,819 | 2/1965 | Santeler | 62—55.5 |
| 3,262,279 | 7/1966 | Moore, Jr. | 62—55.5 X |

FOREIGN PATENTS

| | | | |
|---|---|---|---|
| 1,130,654 | 5/1962 | Germany | 285—47 |

ALBERT W. DAVIS, JR., Primary Examiner

U.S. Cl. X.R.

62—259; 285—47, 187; 220—14